United States Patent [19]
Ishihara

[11] Patent Number: 5,862,423
[45] Date of Patent: *Jan. 19, 1999

[54] CAMERA TO WHICH A FILM HAVING A MAGNETIC STORAGE PART IS APPLICABLE

[75] Inventor: Masaaki Ishihara, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 506,081

[22] Filed: Jul. 24, 1995

[30] Foreign Application Priority Data

Aug. 2, 1994 [JP] Japan .................................. 6-198983

[51] Int. Cl.⁶ .................................................. G03B 17/24
[52] U.S. Cl. .......................................... 396/320; 396/319
[58] Field of Search ............................ 354/76, 105, 106; 360/1, 3; 396/319, 320, 312

[56] References Cited

U.S. PATENT DOCUMENTS

| | | | |
|---|---|---|---|
| 5,037,100 | 8/1991 | Kubo | 354/105 |
| 5,136,318 | 8/1992 | Aoshima | 354/105 |
| 5,200,777 | 4/1993 | Zander | 354/275 |
| 5,272,498 | 12/1993 | Wakabayashi | 354/105 |
| 5,319,406 | 6/1994 | Takatori | 354/275 |
| 5,353,078 | 10/1994 | Aoshima | 354/105 |
| 5,430,512 | 7/1995 | Itoh et al. | 354/106 |
| 5,448,321 | 9/1995 | Matsukawa | 354/106 |
| 5,481,322 | 1/1996 | Wakabayashi | 354/105 |
| 5,517,266 | 5/1996 | Funaki et al. | 354/106 |
| 5,559,568 | 9/1996 | Kazami et al. | 396/320 |
| 5,572,268 | 11/1996 | Tamamura | 396/320 |

FOREIGN PATENT DOCUMENTS 4343043  6/1994  Germany ........................ G03B 19/30

*Primary Examiner*—Alan A. Mathews
*Attorney, Agent, or Firm*—Robin, Blecker & Daley

[57] ABSTRACT

A camera or an apparatus to which a film having a magnetic storage part is applicable, or a unit adapted for the camera or the apparatus, includes a magnetic head for acting on the magnetic storage part of the film, and a holding member arranged to hold the magnetic head and having a space for disposing a predetermined structure, which space is located in a direction approximately perpendicular to a moving direction of the film with respect to the magnetic head, or a movable holding member arranged to hold the magnetic head and having a space for disposing a predetermined structure.

45 Claims, 8 Drawing Sheets

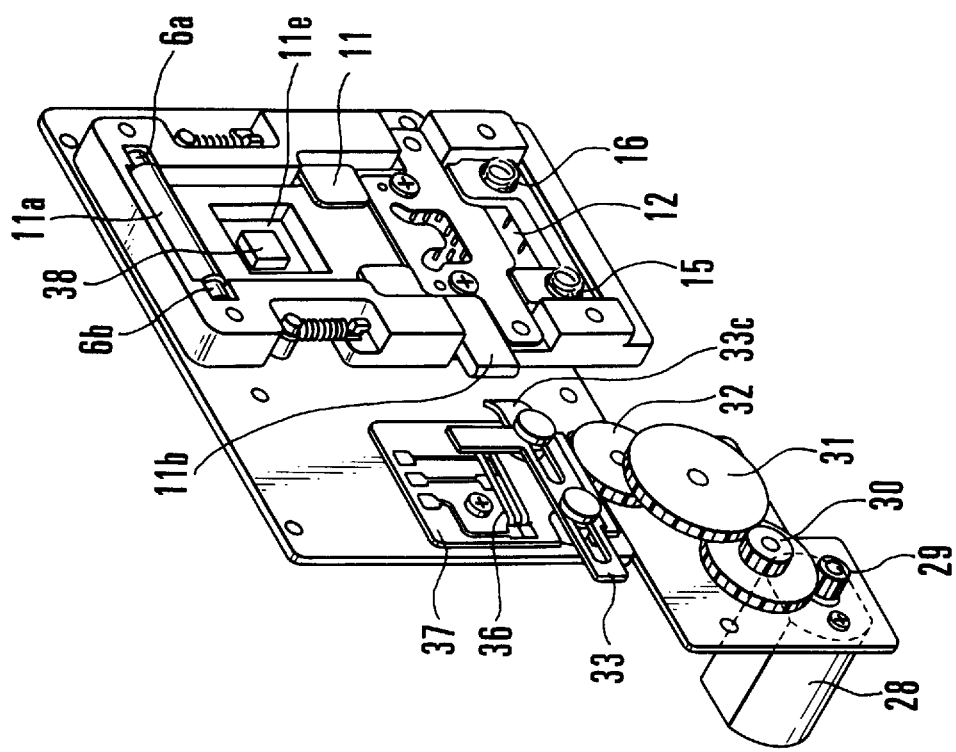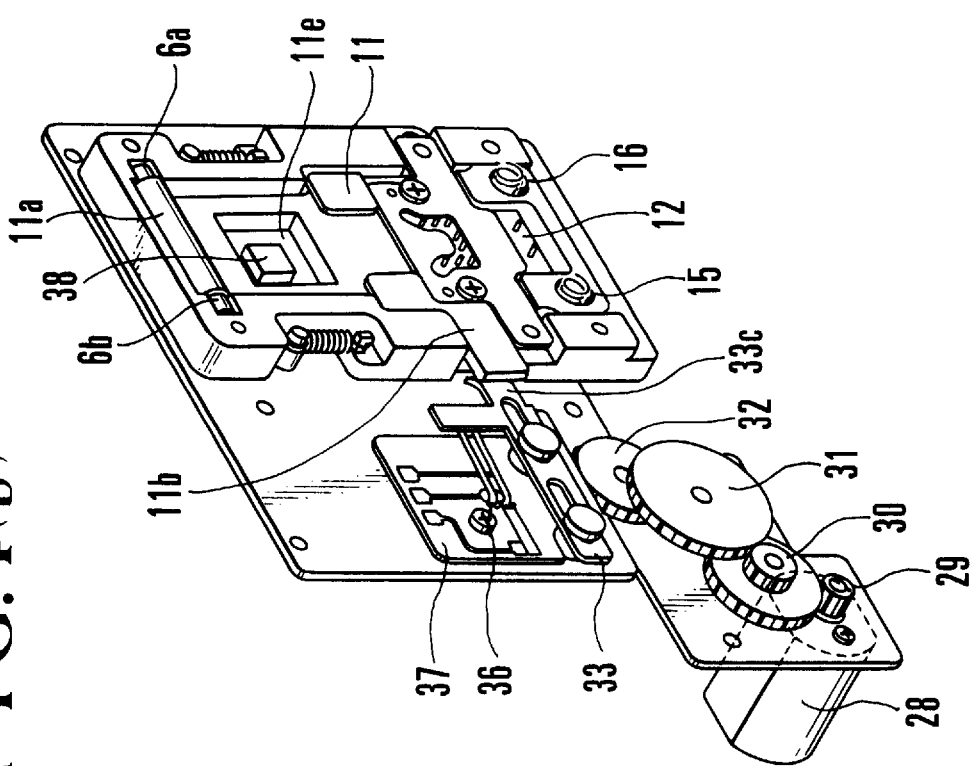

CAMERA TO WHICH A FILM HAVING A MAGNETIC STORAGE PART IS APPLICABLE

BACKGROUND OF THE INVENTION

1. Field of the Invention

This invention relates to a camera to which a film having a magnetic storage part is applicable and which is provided with a magnetic head arranged to write or read information into or out of the magnetic storage part of the film.

2. Description of the Related Art

A camera of the kind having a magnetic head which is arranged to write or read information into or out of a magnetic storage part provided on a film and a holding member which is arranged to hold the magnetic head in such a way as to allow the magnetic head to swing on a support shaft extending in parallel with a transport direction of the film has been disclosed in Japanese Laid-Open Patent Application No. HEI 5-158136.

In the above-stated camera, the magnetic head is arranged to be capable of swinging on the support shaft of the holding member so as to follow any positional variation of the film taking place perpendicular to the film surface while the film is in process of transportation, and the magnetic head is arranged also to be located as far away as possible from the support shaft so that the magnetic head can be kept in constant contact with the film surface even when the magnetic head swings on the support shaft. With the magnetic head thus positioned far away from the support shaft, however, the size of a magnetic head unit including the magnetic head and the holding member increases. The increase in size of the magnetic head unit leaves only a severely limited space above a pressure plate for arranging other mechanisms or elements and thus has presented a problem in that the size of the camera also inevitably increases.

SUMMARY OF THE INVENTION

It is one aspect of this invention to provide a camera or an apparatus to which a film having a magnetic storage part is applicable, or a unit adapted for the camera or the apparatus, so as to enhance the efficiency of space arrangement for reduction in size, comprising a magnetic head for acting on the magnetic storage part of the film, and holding means for holding the magnetic head and having a space for disposing a predetermined structure, the space being located in a direction approximately perpendicular to a moving direction of the film with respect to the magnetic head.

It is another aspect of this invention to provide a camera or an apparatus to which a film having a magnetic storage part is applicable, or a unit adapted for the camera or the apparatus, so as to enhance the efficiency of space arrangement for reduction in size, comprising a magnetic head for acting on the magnetic storage part of the film, and movable holding means for holding the magnetic head and having a space for disposing a predetermined structure.

The above and other aspects and features of this invention will become apparent from the following detailed description of preferred embodiments thereof taken in connection with the accompanying drawings.

BRIEF DESCRIPTION OF THE DRAWINGS

FIGS. 4(a) and 4(b) are oblique views showing different states of various members of the pressure plate unit obtained when the camera is writing or reading information and when the camera is performing an exposure action on the film.

DETAILED DESCRIPTION OF THE PREFERRED EMBODIMENT

Preferred embodiments of this invention are described below with reference to the drawings.

(First Embodiment)

Figure 1:
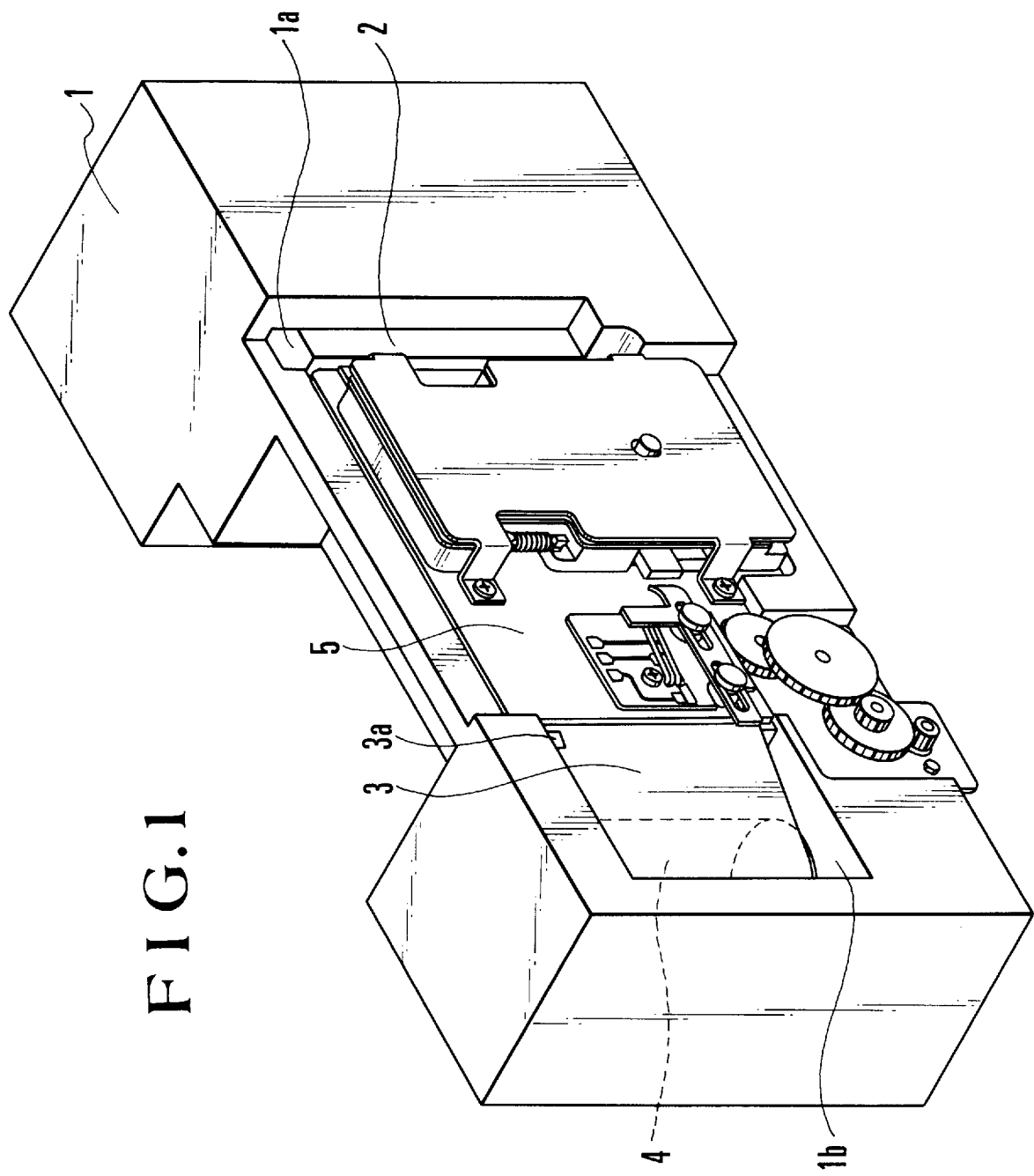
FIG. 1 is an oblique view showing essential parts of a camera arranged according to this invention as a first embodiment thereof.

FIGS. 1 to 4 show a camera which is arranged as a first embodiment of this invention. Of these drawings, FIG. 1 is an oblique view showing the arrangement of essential parts of the camera. Referring to FIG. 1, a camera body 1 includes a cartridge chamber 1a and a spool chamber 1b. A film cartridge 2 which is usable by this embodiment contains therein a film 3 which is provided with a magnetic storage part and perforations 3a. A film takeup spool 4 of the camera is arranged to take up the film 3 with the spool 4 rotated through a transmission gear train by a motor which is not shown. A pressure plate 5 is secured to the camera body 1.

Figure 2:
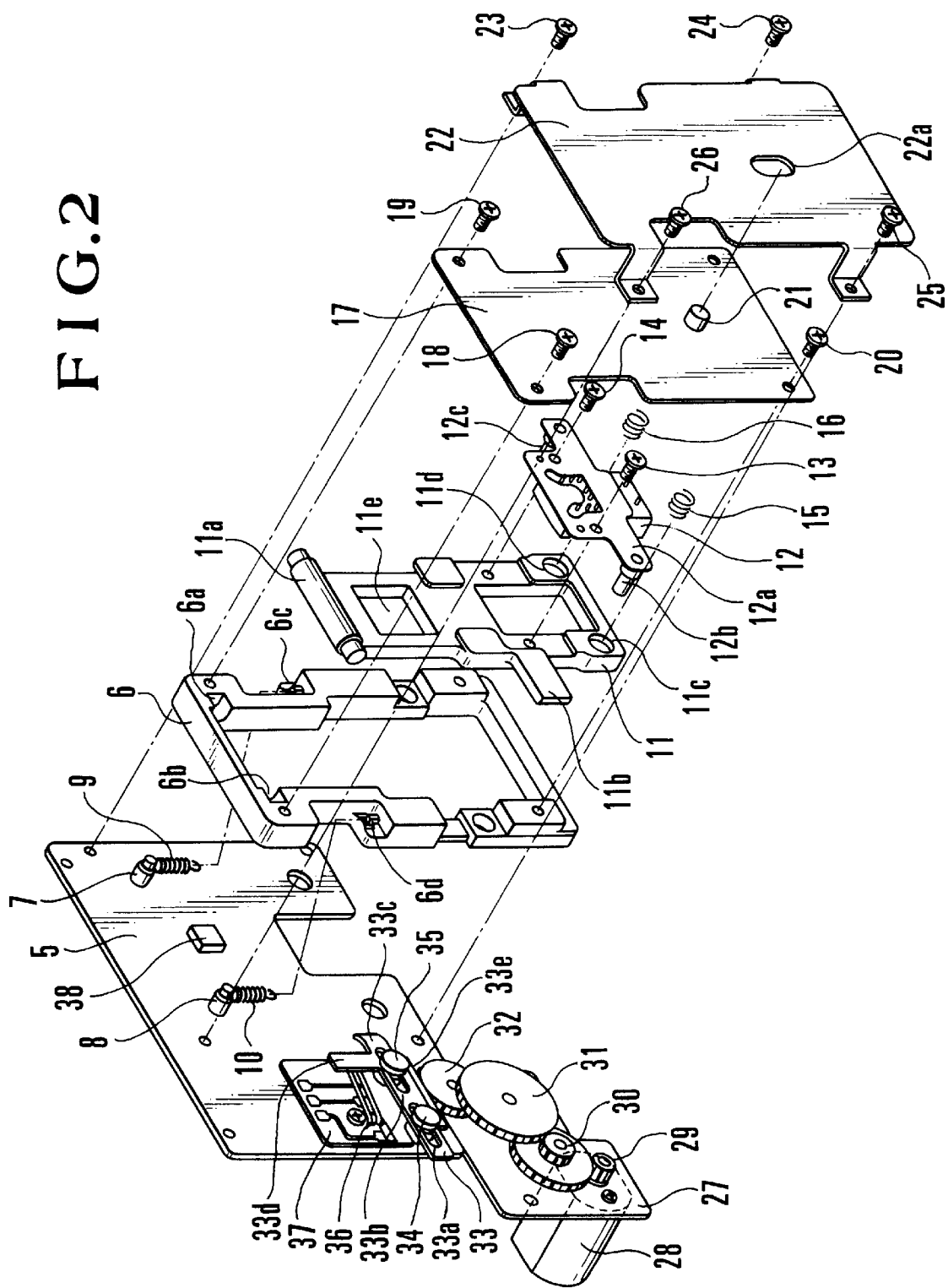
FIG. 2 is an exploded oblique view showing a pressure plate unit of the first embodiment.

FIG. 2 shows in an exploded oblique view the details of a pressure plate unit in a state of having been removed from the camera body 1. Referring to FIG. 2, a slide holder 6 includes bearing parts 6a and 6b and spring hooking pegs 6c and 6d. Spring hooking pins 7 and 8 are planted in the pressure plate 5. Slide springs 9 and 10 are disposed respectively between the spring hooking peg 6c and the spring hooking pin 7 and between the spring hooking peg 6d and the spring hooking pin 8 and arranged to urge the slide holder 6 to move upward. A head holder 11 includes a rotation shaft 11a, an arm 11b, spring receiving parts 11c and 11d and a cutout part 11e which is provided for disposing a perforation detecting means 38. The cutout part 11e is located in a direction approximately perpendicular to the moving direction of the film with respect to the magnetic head 12. The rotation shaft 11a extends in parallel with the film moving direction and is rotatably held by the bearing parts 6a and 6b of the slide holder 6. The magnetic head 12 is arranged to write and read information into and out of the magnetic storage part of the film 3. The magnetic head 12 is provided with a mounting base plate 12a and guide shafts 12b and 12c and is secured to the head holder 11 together with these parts by screws 13 and 14.

Pushing springs 15 and 16 abut respectively on the spring receiving parts 11c and 11d of the head holder 11 at one end and are arranged to push the magnetic head 12 against the film surface 3 by causing the head holder 11 to swing on the rotation shaft 11a. A spring retainer 17 is secured to the slide holder 6 by screws 18, 19, 20, etc., and is arranged to receive the ends of the pushing springs 15 and 16. A slide guide shaft 21 is mounted on the spring retainer 17 and is arranged to be vertically slidable and rotatably guided within a slot 22a formed in a slide guide 22. The slide guide 22 is secured to the pressure plate 5 by screws 23 to 26.

A motor base plate 27 is secured to the camera body 1. A motor 28 is secured to the motor base plate 27. A pinion gear 29 is secured to the output shaft of the motor 28. Double gears 30 and 31 are arranged after the pinion gear 29. An idle gear 32 is in mesh with the small gear (not shown) of the double gear 31. A slide lever 33 has a rack part 33e arranged to mesh with the idle gear 32 and includes slots 33a and 33b, a tapered part 33c and an arm 33d. Guide shafts 34 and 35 are secured to the pressure plate 5 and are arranged to hold the slide lever 33 in such a way as to allow the slide lever 33 to slide right and left as viewed on FIG. 2. A phase contact 36 is secured to the arm 33d of the slide lever 33. A phase circuit board 37 is secured to the pressure plate 5 and is arranged to detect, in conjunction with the phase contact 36, that the slide lever 33 has reached its left end position or its right end position.

Figure 3:
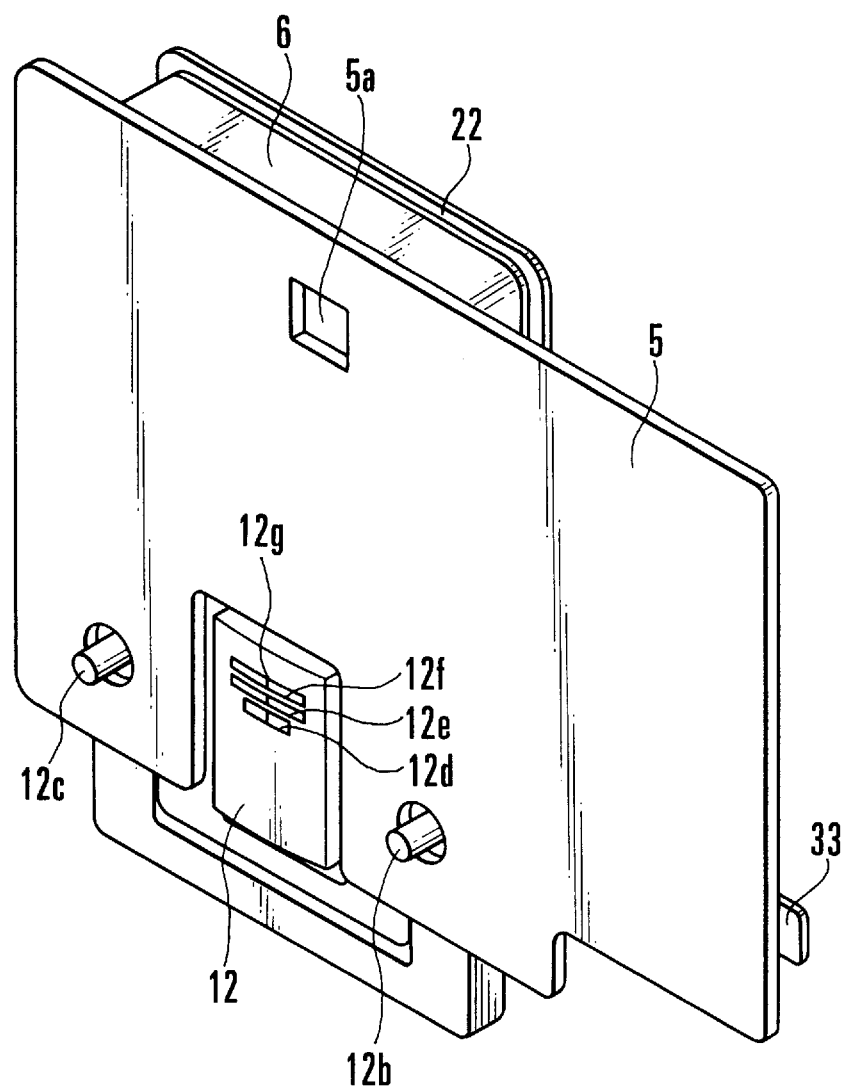
FIG. 3 is an oblique view showing the pressure plate unit as viewed from a film surface.

The perforation detecting means 38 is provided for detecting perforations 3a formed in the film 3 having a magnetic storage part. The perforation detecting means 38 is secured to the pressure plate 5 by means of an adhesive or a screw and is arranged to detect the perforations 3a through a detection window 5a provided in the pressure plate 5 as shown in FIG. 3. Further, a photo-reflector or a photo-interrupter or the like is employed as the perforation detecting means 38.

FIG. 3 shows the pressure plate unit of FIG. 2 as viewed from the film surface. The magnetic head 12 is provided with a first track forming part 12d, a second track forming part 12e and a third track forming part 12f. Each of the track forming parts 12d, 12e and 12f has a gap part 12g which is formed in the direction of orthogonally intersecting the film transport direction. Each of the track forming parts 12d, 12e and 12f measures about 0.5 to 1 mm in width, while the gap part 12g measures several microns in width. The guide shafts 12b and 12c are arranged to be always kept in contact with the lower edge face of the film 3 by the slide springs 9 and 10 (see FIG. 2).

With the embodiment arranged in the manner as described above, the gap part 12g of the magnetic head 12 is swung on the rotation shaft 11a by the pushing springs 15 and 16 to be always elastically pushed toward the film surface. Therefore, even when the position of the film 3 fluctuates in the direction of its thickness in a stepped difference part between inner and outer rails of the camera body 1, the gap part 12g of the magnetic head 12 can be maintained in a state of closely contacting with the magnetic storage part of the film 3 without deviating from its position.

FIG. 4(a) shows in an oblique view the state of each member obtained when the magnetic head 12 is writing or reading information into or out of the magnetic storage part of the film 3 while the film 3 is in process of transportation. In writing or reading information into or out of the magnetic storage part of the film 3, the slide lever 33 is caused to begin to slide to the left through the transmission gears 30, 31 and 32 when the motor 28 is driven to rotate clockwise as viewed on the drawing. After that, when the combination of the phase contact 36 and the phase circuit board 37 detects arrival at the left end position of the slide lever 33, the motor 28 is stopped from being driven. Then, since the slide lever 33 is in a position not to act in any manner on the head holder 11, the gap part 12g of the magnetic head 12 is pushed against the magnetic storage part of the film 3 by the elastic force of the pushing springs 15 and 16.

FIG. 4(b) shows in an oblique view each of the members of the embodiment in a state obtained when the camera is performing an exposure action on the film 3. In this instance, the motor 28 is driven to rotate counterclockwise as viewed on the drawing. The slide lever 33 is caused through the transmission gears 30, 31 and 32 to begin to slide to the right. Then, the tapered part 33c of the slide lever 33 comes into a part under the arm 11b of the head holder 11 to push the arm 11b upward. With the arm 11b thus pushed, the head holder 11 is swung on the rotation shaft 11a against the forces of the pushing springs 15 and 16. Thus, the magnetic head 12 is released from the state of closely contacting with the film 3 by this motion of the head holder 11. The magnetic head 12 is kept in this state while an exposure is in process, for the purpose of preventing any adverse effect of pushing the magnetic head 12 against the film 3 on the flatness of the film 3.

Further, in order to keep the state of contact between the magnetic head 12 and the surface of the film 3 constant as much as possible even when the position of the film 3 fluctuates in the direction of its thickness, the rotation shaft 11a of the head holder 11 must be arranged to be separate as much as possible from the magnetic head 12.

While a photoelectric element such as a photo-reflector or a photo-interrupter is employed as the perforation detecting means in this embodiment, the same advantageous effect can be attained by arranging, in the cutout part of the holding member for the magnetic head, some mechanical element such as a sprocket which rotates while engaging the perforations of the film.

(Second Embodiment)

Figure 5:
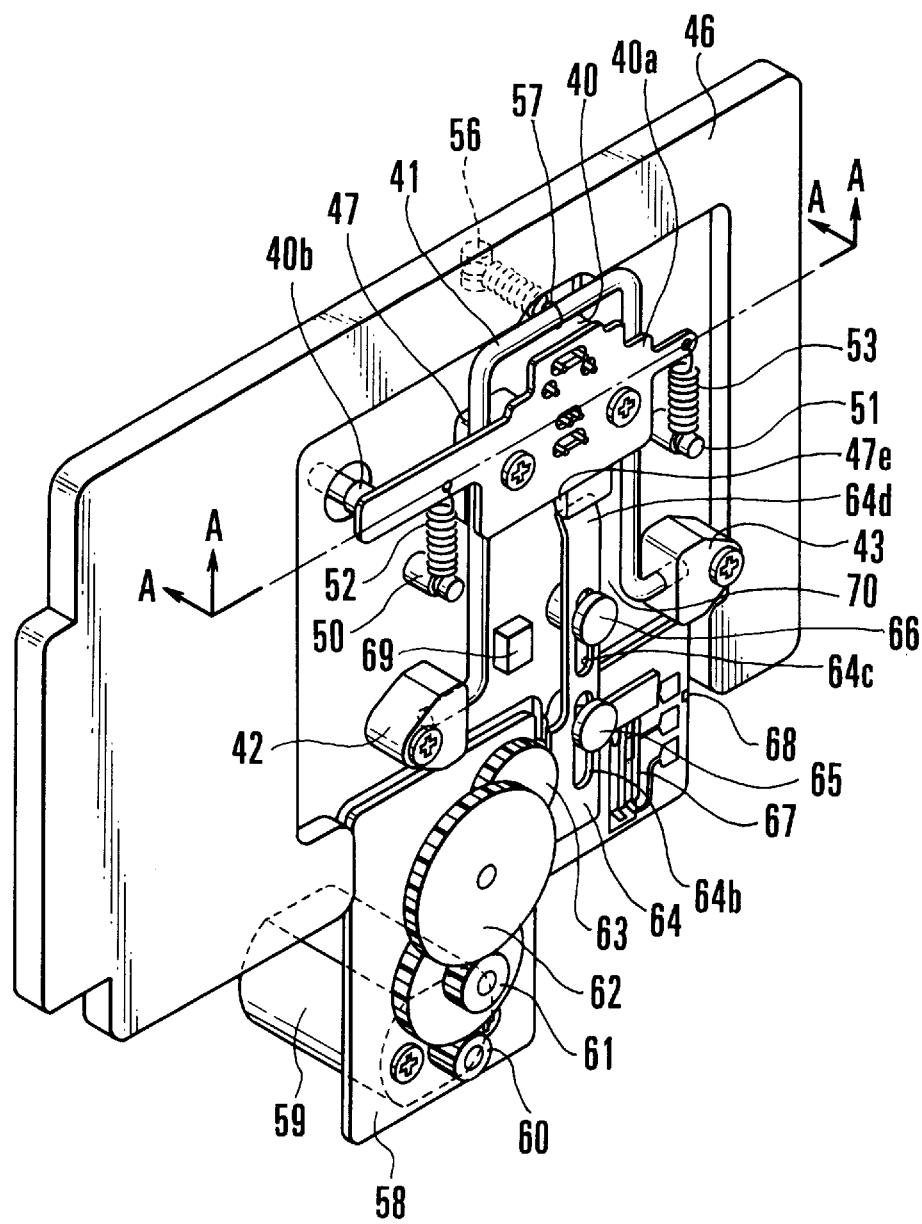
FIG. 5 is an oblique view showing a pressure plate unit of a second embodiment of this invention.
Figure 6:
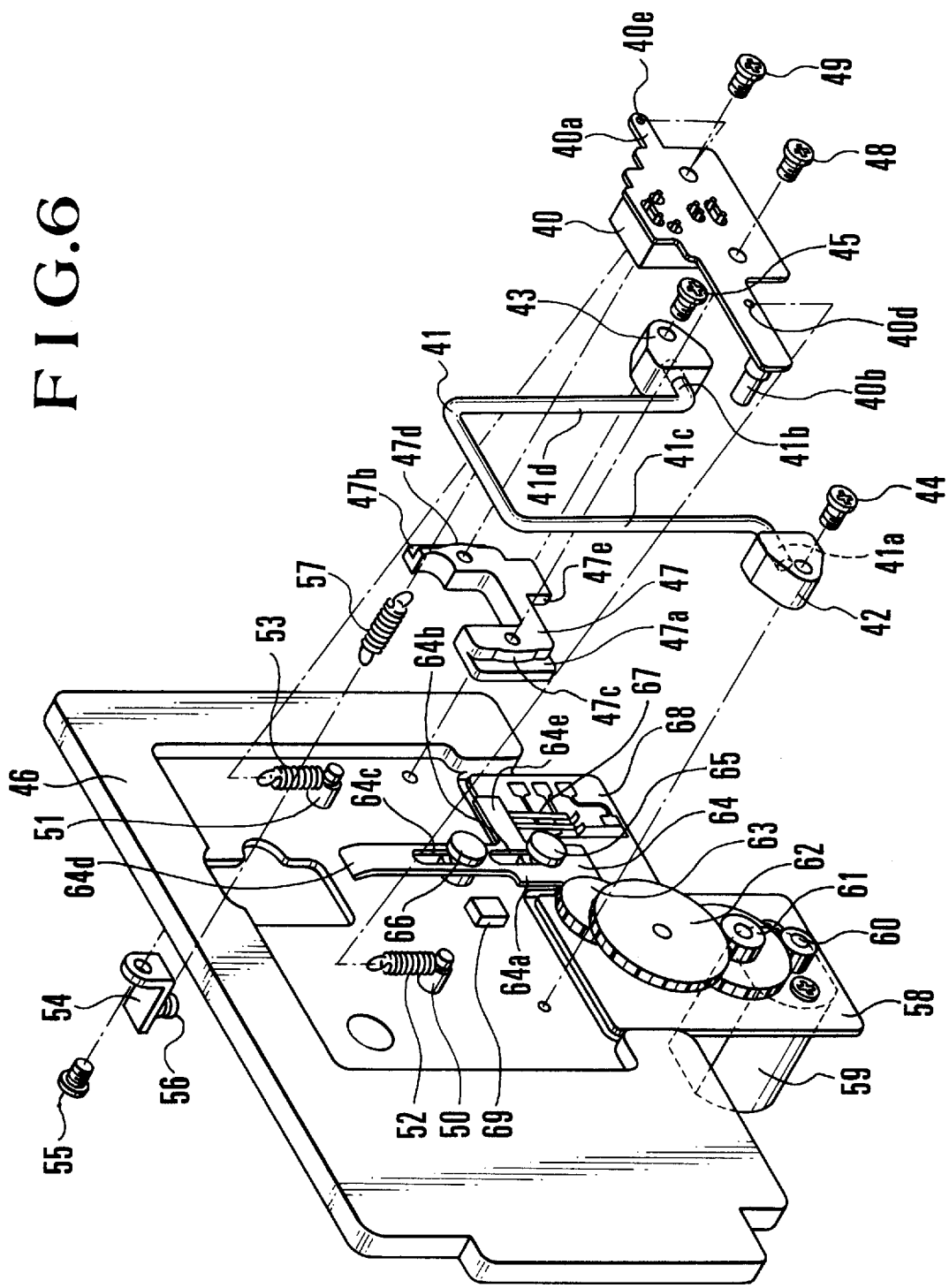
FIG. 6 is an exploded oblique view showing the pressure plate unit of the second embodiment.
Figure 7:
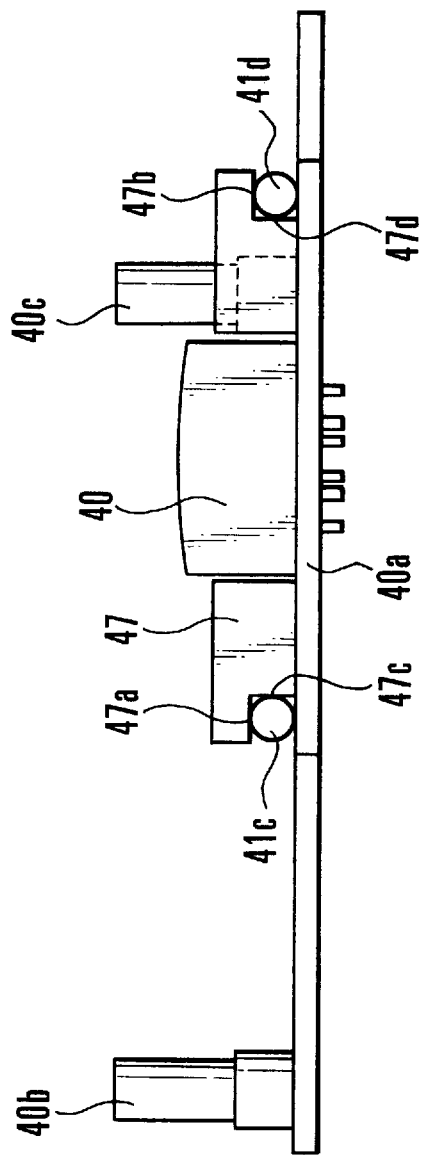
FIG. 7 is a sectional view showing the second embodiment shown in FIG. 5.

FIGS. 5, 6 and 7 relate to a camera which is arranged as a second embodiment this invention. FIG. 5 is an oblique view showing a pressure plate unit of the camera. FIG. 6 is an exploded oblique view of the same pressure plate. Since the camera is arranged as a whole in the same manner as the first embodiment, other parts of the camera is omitted from illustrations.

Referring to FIGS. 5 and 6, a magnetic head 40 is arranged to write or read information into or out of the magnetic storage part of a film 3 which is of the kind having a magnetic storage part. The magnetic head 40 is provided with a mounting base plate 40a and guide 41 to shafts 40b and 40c as shown in FIG. 7. The mounting base plate 40a is provided with spring hooking parts 40d and 40e for hooking springs which will be described later. A slide guide 41 is formed by bending a shaft of a circular sectional shape and consists of bent parts 41a and 41b which are in parallel with the film transport direction and guide parts 41c and 41d which orthogonally intersect the film transport direction and are in parallel to each other. Guide bearings 42 and 43 are arranged to engage the bent parts 41a and 41b of the slide guide 41 and to rotatably support the slide guide 41 to allow the slide guide 41 to swing on the bent parts 41a and 41b. Screws 44 and 45 fix the guide bearings 42 and 43 to the pressure plate 46. A holder 47 includes sliding parts 47a and 47b which have flat surfaces, R sliding parts 47c and 47d which are in an R-like shape and a push-up arm part 47e. The magnetic head 40 and the holder 47 are joined together by means of screws 48 and 49 with the guide parts 41c and 41d of the slide guide 41 sandwiched between them.

FIG. 7 is a sectional view of the arrangement taken along a line A—A of FIG. 5. As shown, the guide parts 41c and 41d of the slide guide 41 are slidably sandwiched among the sliding parts 47a and 47b of the holder 47, the R sliding parts 47c and 47d and the mounting base plate 40a of the magnetic head 40. With the embodiment arranged in this manner, the magnetic head 40 is held in such a way as to be movable on a plane which is in parallel with the film surface and in the directions of rotation and the width of the film.

Spring hooking pins 50 and 51 are planted in the pressure plate 46. Slide springs 52 and 53 are hooked and stretched respectively between the spring hooking part 40d of the magnetic head 40 and the spring hooking pin 50 and between the spring hooking part 40e of the magnetic head 40 and the spring hooking pin 51. These springs 52 and 53 are thus arranged to urge the magnetic head 40 to move downward as viewed on the drawing. An angle member 54 has a spring hooking pin 56 planted therein and is secured to the pressure plate 46 by a screw 55. A pushing spring 57 is arranged between the spring hooking pin 56 and the slide guide 41 to urge the slide guide 41 to swing on the bent parts 41a and 41b in such a way as to push the magnetic head 40 against the film surface. A motor base plate 58 is secured to the camera body 1. A motor 59 is secured to the motor base plate 58. A pinion gear 60 is secured to the output shaft of the motor 59. There are provided double gears 61 and 62. An idle gear 63 is in mesh with the small gear part (not shown) of the double gear 62. A slide lever 64 includes a rack part 64a which is in mesh with the idle gear 63. The slide lever 64 is provided with slots 64b and 64c, a tapered part 64d and an arm part 64e. Guide shafts 65 and 66 are secured to the pressure plate 46 and engage respectively the slots 64b and 64c of the slide lever 64 to hold the slide lever 64 to be vertically slidable as viewed on the drawing. A phase contact 67 is secured to the arm part 64e of the slide lever 64. A phase circuit board 68 is secured to the camera body 1 and is arranged to detect, in conjunction with the phase contact 67, arrival of the slide lever 64 at its upper end position or its lower end position. Perforation detecting means 69 is arranged in the same manner as the means 38 of FIG. 2 to detect the perforations 3a provided in the film 3 and is secured to the pressure plate 46 by bonding, screws or some other suitable means. A space 70 encompassed with the guide parts 41c and 41d of the slide guide 41 is provided for disposing the perforation detecting means 69. The space 70 is located in a direction approximately perpendicular to the moving direction of the film 3 with respect to the magnetic head 40.

FIG. 5 shows the state of each member obtained when the magnetic head 40 is operated to write or read information into or out of the magnetic storage part of the film 3 while the camera is in process of transporting the film 3. In this instance, the slide lever 64 is located in a lower part as viewed on the drawing. The tapered part 64d of the slide lever 64 is not engaging the pushing-up arm part 47e of the holder 47. Therefore, the magnetic head 40 is in the state of being pushed against the film surface by the force of the pushing spring 57.

In exposing the film 3 to light, the motor 59 is driven to rotate clockwise. The slide lever 64 is caused to begin to slide upward through the transmission gears 61, 62 and 63. The tapered part 64d of the slide lever 64 then comes into a part under the pushing-up arm part 47e to push pushing-up arm part 47e upward. This upward motion causes the slide guide 41 to swing on the bent parts 41a and 41b against the pushing force of the pushing spring 57. The magnetic head 40 is released from its state of closely contacting with the film 3 by this swinging movement. This state is maintained while the camera is in process of making an exposure for the purpose of preventing any adverse effect on the flatness of the film 3 resulting from pushing the magnetic head against the film 3.

(Third Embodiment)

Figure 8:
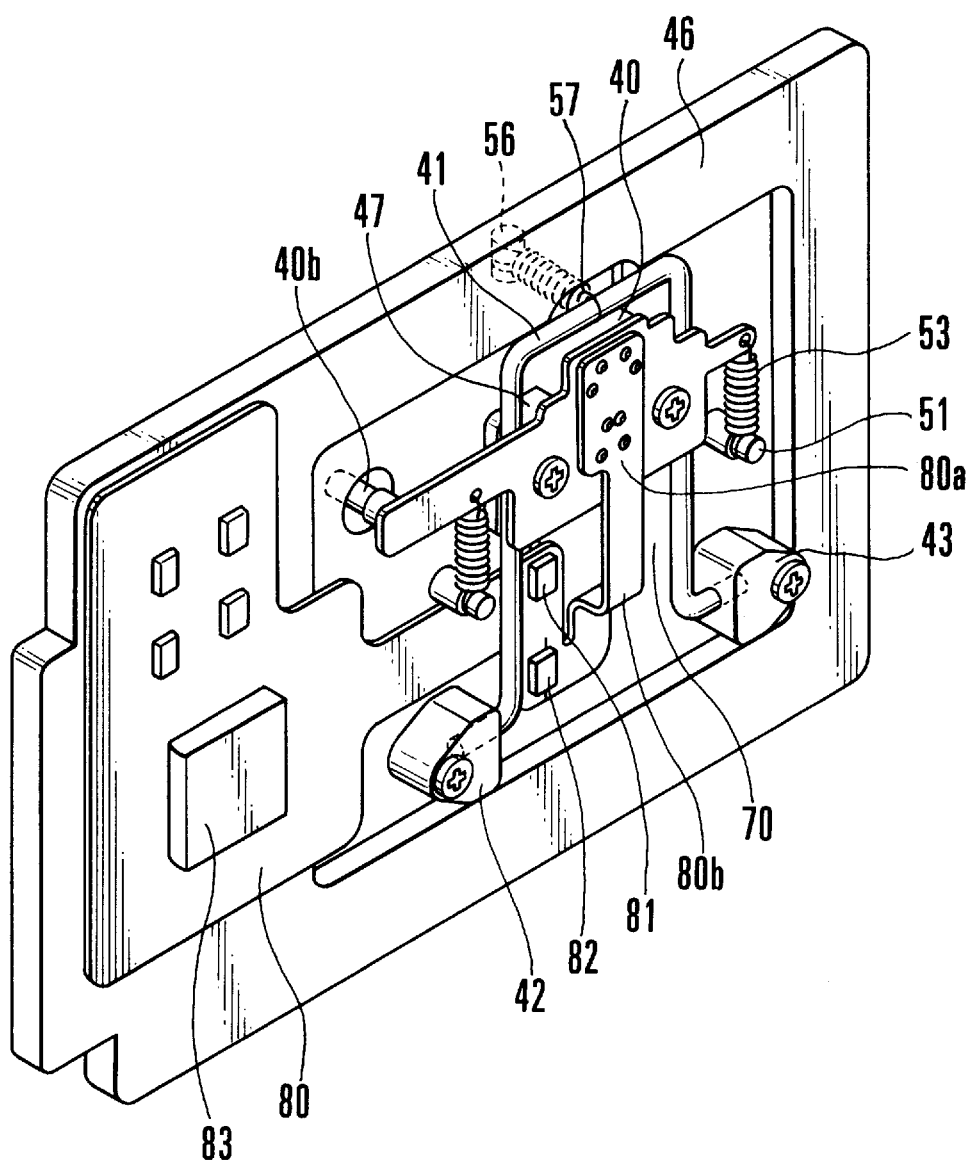
FIG. 8 is an oblique view showing a pressure plate unit of a third embodiment of this invention.

FIG. 8 shows in an oblique view a pressure plate unit of a camera arranged as a third embodiment of this invention. The arrangement of the camera as a whole is identical with the first embodiment described in the foregoing and is, therefore, omitted from illustrations. In FIG. 8, all members that are the same as those of the second embodiment are indicated by the same reference numerals.

Referring to FIG. 8, a flexible printed circuit board 80 includes a connection part 80a which is provided for electrical connection with the terminal of the magnetic head 40 and a bent part 80b which is arranged to allow the slide guide 41 to move, without hindrance, the magnetic head 40 in vertical and rotating directions on a plane parallel to the film surface as desired. In FIG. 8, reference numerals 81, 82 and 83 denote electrical elements mounted on the printed circuit board 80 such as an IC, transistors, resistors, etc., or an amplifier or a driver which is provided for reproducing or writing a magnetic signal and consists of such electrical elements. Such a reproduction amplifier or writing driver is apt to be affected by a noise to result in a lower efficiency if it is set in a place away from the magnetic head. Such an element is therefore must be mounted near the magnetic head 40. To meet this requirement, the third embodiment is arranged to mount the reproduction amplifier or writing driver, etc., in the above-stated space 70 which is formed by the slide guide 41 close to the magnetic head 40.

In the third embodiment, all parts for mounting the electrical elements and for connecting the magnetic head are formed with a common flexible printed circuit board. However, this arrangement may be changed to have the electric element mounting part formed by using a hard printed circuit board and the magnetic head connecting part by using a flexible printed circuit board. In such a case, the hard printed circuit board and the flexible printed circuit board may be interconnected by a connector or by soldering. In that case, it goes without saying that the same advantageous effect as that of other embodiments is attainable by disposing the connector part or the soldering part within the above-stated space 70.

This invention applies also to a case where a pad is used as the means for pushing the magnetic head against the film. In such a case, for example, the same structural arrangement as that applied to the magnetic head in the above-stated embodiments may be applied to the pad.

This invention is applicable to a case where an image recording medium other than a film is used.

This invention is applicable also to a case where information is to be recorded or read into or out of a film in a manner other than electrical, optical and magnetic methods.

Further, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the individual components shown in schematic or block form in the drawings are all well-known in the camera arts and their specific construction and operation are not critical to the operation or best mode for carrying out the invention.

The embodiments described and the technological elements of them may be combined as necessary.

This invention applies to various cases where either the whole of or a part of the claims or the arrangement of any of the embodiments described is embodied one apparatus or combined with some other apparatus or is used to form a component of an apparatus.

Further, this invention is applicable to cameras of varied kinds such as a single-lens reflex camera, a lens-shutter type camera, a video camera, etc., and to optical apparatuses other than cameras, other apparatuses and also to devices or units adapted for cameras, optical apparatuses and other apparatuses and to such components that form these apparatuses and devices.

What is claimed is:

1. A camera to which a film having a magnetic storage part is applicable, comprising:
   a) a magnetic head for acting on the magnetic storage part of the film; and
   b) a holding device for holding said magnetic head, said holding device having an aperture, at least one of electric structure and mechanical structure irrelevant to a function of said holding device disposed in said aperture, said aperture being located in a direction approximately perpendicular to a moving direction of the film with respect to said magnetic head.

2. A camera according to claim 1, wherein said holding device includes a device for moving said magnetic head.

3. A camera according to claim 1, wherein said holding device includes a device for moving said magnetic head toward and away from the film.

4. A camera according to claim 1, wherein said holding device includes a device for moving.

5. A camera according to claim 1, wherein said holding device includes a device for swinging.

6. A camera according to claim 1, wherein said holding device includes a device for swinging around a shaft arranged approximately in parallel to the moving direction of the film.

7. A camera according to claim 1, wherein said at least one of electric structure and mechanical structure includes a device for determining a state of the film.

8. A camera according to claim 1, wherein said at least one of electric structure and mechanical structure includes a device for determining a moving state of the film.

9. A camera according to claim 1, wherein said at least one of electric structure and mechanical structure includes an electric circuit.

10. A camera according to claim 1, wherein said at least one of electric structure and mechanical structure includes a photo-interrupter.

11. A camera according to claim 1, wherein said at least one of electric structure and mechanical structure includes a photo-reflector.

12. A camera to which a film having a magnetic storage part is applicable, comprising:
    a) a magnetic head for acting on the magnetic storage part of the film; and
    b) a movable holding device for holding said magnetic head, said holding device having an aperture, at least one of electric structure and mechanical structure irrelevant to a function of said holding device disposed in said aperture.

13. A camera according to claim 12, wherein said holding device includes a device for moving said magnetic head.

14. A camera according to claim 12, wherein said holding device includes a device for moving said magnetic head toward and away from the film.

15. A camera according to claim 12, wherein said holding device includes a device for swinging.

16. A camera according to claim 12, wherein said holding device includes a device for swinging around a shaft arranged approximately in parallel to the moving direction of the film.

17. A camera according to claim 12, wherein said at least one of electric structure and mechanical structure includes a device for determining a state of the film.

18. A camera according to claim 12, wherein said at least one of electric structure and mechanical structure includes a device for determining a moving state of the film.

19. A camera according to claim 12, wherein said at least one of electric structure and mechanical structure includes an electric circuit.

20. A camera according to claim 12, wherein said at least one of electric structure and mechanical structure includes a photo-interrupter.

21. A camera according to claim 12, wherein said at least one of electric structure and mechanical structure includes a photo-reflector.

22. A camera according to claim 12, wherein said at least one of electric structure and mechanical structure includes an amplifier.

23. A camera according to claim 12, wherein said at least one of electric structure and mechanical structure includes a driving circuit for driving said magnetic head.

24. A camera to which a film having a magnetic storage part is applicable, comprising:
    a) a pushing device for pushing the film against a magnetic head arranged to act on the magnetic storage part of the film; and
    b) a holding device for holding said pushing device, said holding device having an aperture, at least one of electric structure and mechanical structure irrelevant to a function of said holding device disposed in said aperture, said aperture being located in a direction approximately perpendicular to a moving direction of the film with respect to said pushing device.

25. A camera to which a film having a magnetic storage part is applicable, comprising:
    a) a pushing device for pushing the film against a magnetic head arranged to act on the magnetic storage part of the film; and
    b) a movable holding device for holding said pushing device, said holding device having an aperture, at least one of electric structure and mechanical structure irrelevant to a function of said holding device disposed in said aperture.

26. An apparatus to which a film having a magnetic storage part is applicable, comprising:
    a) a magnetic head for acting on the magnetic storage part of the film; and
    b) a holding device for holding said magnetic head, said holding device having an aperture, at least one of electric structure and mechanical structure irrelevant to a function of said holding device disposed in said aperture, said aperture being located in a direction approximately perpendicular to a moving direction of the film with respect to said magnetic head.

27. An aperture to which a film having a magnetic storage part is applicable, comprising:
    a) a magnetic head for acting on the magnetic storage part of the film; and
    b) a movable holding device for holding said magnetic head, said holding device having an aperture, at least one of electric structure and mechanical structure irrelevant to a function of said holding device disposed in said aperture.

28. An apparatus to which a film having a magnetic storage part is applicable, comprising:
    a) a pushing device for pushing the film against a magnetic head arranged to act on the magnetic storage part of the film; and
    b) a holding device for holding said pushing device, said holding device having an aperture, at least one of electric structure and mechanical structure irrelevant to a function of said holding device disposed in said aperture, said aperture being located in a direction approximately perpendicular to a moving direction of the film with respect to said pushing device.

29. An apparatus to which a film having a magnetic storage part is applicable, comprising:
   a) a pushing device for pushing the film against a magnetic head arranged to act on the magnetic storage part of the film; and
   b) a movable holding device for holding said pushing device, said holding device having an aperture, at least one of electric structure and mechanical structure irrelevant to a function of said holding device disposed in said aperture.

30. A unit adapted for at least one of a camera and an apparatus to each of which a film having a magnetic storage part is applicable, comprising:
   a) a magnetic head for acting on the magnetic storage part of the film; and
   b) a holding device for holding said magnetic head, said holding device having an aperture, at least one of electric structure and mechanical structure irrelevant to a function of said holding device disposed in said aperture, said aperture being located in a direction approximately perpendicular to a moving direction of the film with respect to said magnetic head.

31. A unit adapted for at least one of a camera and an apparatus to each of which a film having a magnetic storage part is applicable, comprising:
   a) a magnetic head for acting on the magnetic storage part of the film; and
   b) a movable holding device for holding said magnetic head, said holding device having an aperture, at least one of electric structure and mechanical structure irrelevant to a function of said holding device disposed in said aperture.

32. A unit adapted for at least one of a camera and an apparatus to each of which a film having a magnetic storage part is applicable, comprising:
   a) a pushing device for pushing the film against a magnetic head arranged to act on the magnetic storage part of the film; and
   b) a holding device for holding said pushing device, said holding device having an aperture, at least one of electric structure and mechanical structure irrelevant to a function of said holding device disposed in said aperture, said aperture being located in a direction approximately perpendicular to a moving direction of the film with respect to said pushing device.

33. A unit adapted for at least one of a camera and an apparatus to each of which a film having a magnetic storage part is applicable, comprising:
   a) a pushing device for pushing the film against a magnetic head arranged to act on the magnetic storage part of the film; and
   b) a movable holding device for holding said pushing device, said holding device having an aperture, at least one of electric structure and mechanical structure irrelevant to a function of said holding device disposed in said aperture.

34. A camera to which an image recording medium having a storage part is applicable, comprising:
   a) a head for acting on the storage part of the image recording medium; and
   b) a holding device for holding said head, said holding device having an aperture, at least one of electric structure and mechanical structure irrelevant to a function of said holding device disposed in said aperture, said aperture being located in a direction approximately perpendicular to a moving direction of the image recording medium with respect to said head.

35. A camera to which an image recording medium having a storage part is applicable, comprising:
   a) a head for acting on the storage part of the image recording medium; and
   b) a movable holding device for holding said head, said holding device having an aperture, at least one of electric structure and mechanical structure irrelevant to a function of said holding device disposed in said aperture.

36. A camera to which an image recording medium having a storage part is applicable, comprising:
   a) a pushing device for pushing the image recording medium against a head arranged to act on the storage part of the image recording medium; and
   b) a holding device for holding said pushing device, said holding device having an aperture, at least one of electric structure and mechanical structure irrelevant to a function of said holding device disposed in said aperture, said aperture being located in a direction approximately perpendicular to a moving direction of the image recording medium with respect to said head.

37. A camera to which an image recording medium having a storage part is applicable, comprising:
   a) a pushing device for pushing the image recording medium against a head arranged to act on the storage part of the image recording medium; and
   b) a movable holding device for holding said pushing device, said holding device having an aperture, at least one of electric structure and mechanical structure irrelevant to a function of said holding device disposed in said aperture.

38. An apparatus to which an image recording medium having storage part is applicable, comprising:
   a) a head for acting on the storage part of the image recording medium; and
   b) a holding device for holding said head, said holding device having an aperture, at least one of electric structure and mechanical structure irrelevant to a function of said holding device disposed in said aperture, said aperture being located in a direction approximately perpendicular to a moving direction of the image recording medium with respect to said head.

39. An apparatus to which an image recording medium having a storage part is applicable, comprising:
   a) a head for acting on the storage part of the image recording medium; and
   b) a movable holding device for holding said head, said holding device having an aperture, at least one of electric structure and mechanical structure irrelevant to a function of said holding device disposed in said aperture.

40. An apparatus to which an image recording medium having a storage part is applicable, comprising:
   a) pushing device for pushing the image recording medium against a head arranged to act on the storage part of the image recording medium; and
   b) a holding device for holding said pushing device, said holding device having an aperture, at least one of electric structure and mechanical structure irrelevant to a function of said holding device disposed in said aperture, said aperture being located in a direction approximately perpendicular to a moving direction of the image recording medium with respect to said pushing device.

41. An apparatus to which an image recording medium having a storage part is applicable, comprising:
   a) a pushing device for pushing the image recording medium against a head arranged to act on the storage part of the image recording medium; and
   b) a movable holding device for holding said pushing device, said holding device having an aperture, at least one of electric structure and mechanical structure irrelevant to a function of said holding device disposed in said aperture.

42. A unit adapted for at least one of a camera and an apparatus to each of which an image recording medium having a storage part is applicable, comprising:
   a) a head for acting on the storage part of the image recording medium; and
   b) a holding device for holding said head, said holding device having an aperture, at least one of electric structure and mechanical structure irrelevant to a function of said holding device disposed in said aperture, said aperture being located in a direction approximately perpendicular to a moving direction of the image recording medium with respect to said head.

43. A unit adapted for at least one of a camera and an apparatus to each of which an image recording medium having a storage part is applicable, comprising:
   a) a head for acting on the storage part of the image recording medium; and
   b) a movable holding device for holding said head, said holding device having an aperture, at least one of electric structure and mechanical structure irrelevant to a function or said holding device disposed in said aperture.

44. A unit adapted for at least one of a camera and an apparatus to each of which an image recording medium having a storage part is applicable, comprising:
   a) a pushing device for pushing the image recording medium against a head arranged to act on the storage part of the image recording medium; and
   b) a holding device for holding said pushing device, said holding device having an aperture, at least one of electric structure and mechanical structure irrelevant to a function of said holding device disposed in said aperture, said aperture being located in a direction approximately perpendicular to a moving direction of the image recording medium with respect to said pushing device.

45. A unit adapted for at least one of a camera and an apparatus to each of which an image recording medium having a storage part is applicable, comprising:
   a) a pushing device for pushing the image recording medium against a head arranged to act on the storage part of the image recording medium; and
   b) a movable holding device for holding said pushing device, said holding device having an aperture, at least one of electric structure and mechanical structure irrelevant to a function of said holding device disposed in said aperture.

* * * * *